//  Patent 3,836,568 — Sept. 17, 1974

3,836,568
PROCESS FOR PRODUCTION OF LOWER ALKYL ESTERS OF CIS-CHRYSANTHEMUM MONOCARBOXYLIC ACID

Akio Higo and Nobushige Itaya, Ikeda, Hajime Hirai, Tokyo, and Hirosuke Yoshioka, Toyonaka, Japan, assignors to Sumitomo Chemical Company, Limited, Osaka, Japan
No Drawing. Filed Nov. 24, 1971, Ser. No. 201,988
Claims priority, application Japan, Dec. 28, 1970, 46/129,967; Mar. 11, 1971, 46/13,603
Int. Cl. C07c 67/02, 69/74
U.S. Cl. 260—468 H          7 Claims

ABSTRACT OF THE DISCLOSURE

A process for preparing lower alkyl cis-chrysanthemates of the formula,

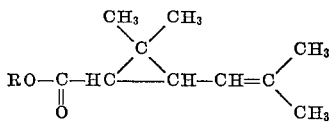

wherein R is a lower alkyl, which comprises reacting a dihydrochrysanthemolactone of the formula,

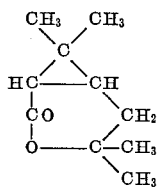

with a lower aliphatic alcohol in the presence of an acid catalyst, to remove the water produced out of the reaction system.

---

The present invention relates to a process for preparing lower alkyl cis-chrysanthemates.

More particularly, the invention relates to a process for preparing a lower alkyl cis-chrysanthemate of the formula,

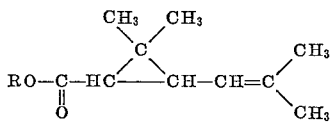

wherein R is a lower alkyl, which comprises reacting a dihydrochrysanthemolactone of the formula,

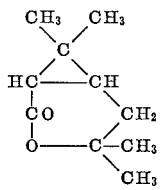

with a lower aliphatic alcohol in the presence of an acid catalyst, to remove the water produced out of the reaction system.

In the present invention, the term "lower alkyl" is intended to mean an alkyl having 1 to 4 carbon atoms.

The chrysanthemic acids are very important as the acid component of so-called pyrethroids, i.e., pyrethrin, allethrin, phthalthrin and the like, which have been widely used as low toxic and rapidly effective insecticides. It is known that ($\pm$)-trans-chrysanthemates in a form of oil spray and aerosol have more excellent insecticidal activities than those of the corresponding ($\pm$)-cis-chrysanthemates, and particularly (+)-trans-chrysanthemates have the most excellent insecticidal activities among the corresponding geometric isomers. On the other hand, it has been recently found that ($\pm$)-cis-chrysanthemates in a form of fumigant, such as mosquito coil, are superior to ($\pm$)-trans-chrysanthemates in insecticidal activities, especially in a knock down effect.

Thus, it is very important to provide a process, by which each geometric isomer can be separated easily at low cost from a technical grade product of chrysanthemic acid which consists of the ($\pm$)-trans-isomer and the ($\pm$)-cis-isomer. It is known to separate each isomer by means of recrystallization using the difference in their solubilities, but this method must be carried out industrially with difficulties.

On the other hand, as a process for obtaining ($\pm$)-trans-chrysanthemic acid from the said mixture, there is known a process in which the mixture is treated in the presence of an acid catalyst under non aqueous conditions to convert ($\pm$)-cis-chrysanthemic acid to neutral dihydrochrysanthemolactone, and ($\pm$)-trans-chrysanthemic acid not reacted is separated by extraction with an aqueous alkali solution.

Further, according to M. Matsui et al.'s reports [Agricultural and Biological Chemistry, Vol. 29, 784–786 (1965), and Vol. 31, 33–39 (1967)], optically pure ($\pm$)- and ($-$)-dihydrochrysanthemolactones can be obtained from $\Delta^3$-carene, which is rich in nature.

Thus, it is very important from industrial point of view to provide the present process, by which optically active or inactive dihydrochrysanthemolactone is converted to optically active or inactive cis-chrysanthemic acid.

According to a process by S. H. Harper et al. [Journal of Science of Food and Agriculture, Vol. 3, 233 (1952)], dihydrochrysanthemolactone can be cleft to give cis-chrysanthemic acid in a low yield by treatment with a diluted sulfuric acid. Further, according to the above-mentioned M. Matsui et al.'s report, cis-chrysanthemic acid can be esterified to give a corresponding ethyl ester by treatment with ethanol containing hydrochloric acid at room temperature for a long period of time. Accordingly, by the combination of these knowledges, it is expected to obtain a lower alkyl cis-chrysanthemate by treating dihydrochrysanthemolactone with a lower alcohol in the presence of an acid catalyst, but many experiments result in only recovery of the starting material or in obtaining a hydrogen chloride-adduct as mentioned in the following referential examples.

REFERENTIAL EXAMPLE 1

A mixture of 10 g. of dihydrochrysanthemolactone and 50 g. of ethanol saturated with dry hydrogen chloride was allowed to stand for one week at room temperature, and thereafter the ethanol was removed by distillation under a reduced pressure. The residue was dissolved in benzene, washed with 5% aqueous solution of sodium bicarbonate, and successively washed with water. Distillation of benzene at room temperature gave 7 g. of the following ethyl 1',2' - dihydro - 2'-chloro-cis-chrysanthemate as pale yellow oil.

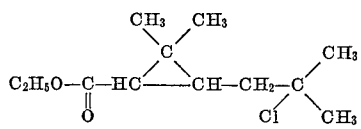

On the other hand, in case where the reaction is conducted at a boiling point of the solvent to be used as mentioned in the following referential examples, various by-products are given to result in obtaining an impure cischrysanthemate in a low yield. Many of the by-products are due to the cleavage of the cyclopropane ring and additive reaction of an alcohol to the double bond of the side chain caused by heating in the presence of an acid catalyst. Thus, there are many difficulties in producing a cis-chrysanthemate by the cleavage of the lactone.

REFERENTIAL EXAMPLE 2

A solution of 20 g. of dihydrochrysanthemolactone in 200 ml. of methanol was mixed with 2 g. of concentrated sulfuric acid, and the mixture was heated for 12 hours under reflux, and thereafter methanol was removed by distillation under a reduced pressure. The residue was dissolved in benzene, washed with 5% aqueous solution of sodium bicarbonate, and successively washed with water. Distillation of benzene under a reduced pressure gave 16 g. of pale yellow oily product.

According to analysis by gas chromatography, the product contained only 7% of methyl cis-chrysanthemate, and the other was methyl 1',2'-dihydro-2'-methoxy-cis-chrysanthemate having the following formula:

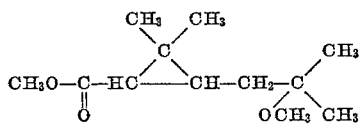

REFERENTIAL EXAMPLE 3

A mixture of 20 g. of dihydrochrysanthemolactone, 55 g. of diethyl sulfate and 80 ml. of toluene was refluxed for 1 hour, and the reaction mixture was washed with water until the aqueous layer was neutralized. Distillation of toluene under a reduced pressure gave 18.5 g. of a yellow oily product.

According to analysis by a gas chromatography, the product contained only 6% of ethyl cis-chrysanthemate, and the other was various materials produced by the cleavage of the cyclopropane ring.

Thus, the present inventors have studied on a factor controlling the reaction, and have found that the side reaction can be almost completely repressed, and the main reaction can be surprisingly promoted to obtain a pure cis-chrysanthemate quantitatively in a short period of time, when water produced is removed immediately out of the reaction system.

In carrying out the process of the present invention, a mixture of dihydrochrysanthemolactone and a lower aliphatic alcohol having 1 to 4 carbon atoms is refluxed in an organic solvent in the presence of an acid catalyst, while water produced being removed immediately out of the reaction system.

Water produced may form an azeotropic mixture with the organic solvent, which is instantly removed from a top of a fractionator attaching to a reactor. Alternatively, the reflux may be passed through a layer packed with a suitable dehydrating agent, whereby water produced can be removed out of the reaction system.

Examples of the aliphatic alcohol are methanol, ethanol, 1-propanol, 2-propanol, 1-butanol and 2-butanol. The alcohol is used in an equimolar or more amounts to dihydrochrysanthemolactone.

Organic solvents conventionally used in an azeotropic dehydration can be used in the present process, for example, they are benzene, toluene, xylene, carbon tetrachloride, chloroform, 1,2-dichloroethane and the like.

There are used the acid catalysts which are hardly distilled and are not decomposed by water, for example, sulfuric acid and p-toluenesulfonic acid are enumerated.

As the dehydrating agent, a Molecular Sieves is favorably used in the present process. In addition, such materials as activated alumina and the like, which are not affected by the alcohol used and do not produce any soluble material which interferes with the reaction, may be used as the dehydrating agent.

The reaction (reflux) time depends on the method for removing water produced. When water produced is removed as the azeotropic mixture, the reaction is conducted for 25 to 48 hours, and when removed by use of the dehydrating agent, the reaction can be completed within a few hours.

The process of the present invention will be illustrated in more detail with reference to the following examples, which are, of course, only illustrative, but not limitative.

EXAMPLE 1

A mixture of 20 g. of (±)-dihydrochrysanthemolactone, 27.4 g. of ethanol, 1 g. of concentrated sulfuric acid and 80 ml. of benzene was heated under reflux. Water produced was distilled out from the top of a fractionating column as the azeotrope, and the reflux was continued for 25 hours. After the reaction was over, ethanol was removed by distillation under a reduced pressure. To the residue was added 100 ml. of benzene, and the mixture was washed with water three times, until the aqueous layer was made neutral, and was dried over anhydrous sodium sulfate. Benzene was removed by distillation under a reduced pressure. The residual oily product was subjected to distillation under reduced pressure of 20 mm. Hg, whereby 22.0 g. of almost colorless liquid was collected at boiling point of 110° C. The infrared absorption spectrum thereof was identical with that of ethyl (±)-cis-chrysanthemate.

EXAMPLE 2

A mixture of 20 g. of (±)-dihydrochrysanthemolactone, 27.4 g. of ethanol, 1 g. of p-toluenesulfonic acid and 80 ml. of toluene was heated under reflux, and water was distilled out from the top of a fractionating column as the azeotrope. The reflux was continued for 25 hours. Thereafter, the mixture was treated according to the procedure similar to that of Example 1, whereby 22.0 g. of almost colorless liquid was obtained. The infrared absorption specrtum thereof was identical with that of ethyl (±)-cis-chrysanthemate.

EXAMPLE 3

A mixture of 20 g. of (±)-dihydrochrysanthemolactone, 27.4 g. of ethanol, 1 g. of p-toluenesulfonic acid and 80 ml. of 1,2-dichloroethane was heated under reflux, and water produced was distilled out of the top of a fractionating column as the azeotrope. The reflux was continued for 35 hours. The mixture was treated according to the procedure similar to that of Example 1, whereby 21.5 g. of almost colorless liquid was obtained. The infrared absorption spectrum thereof was identical with that of ethyl (±)-cis-chrysanthemate.

EXAMPLE 4

A mixture of 70 g. of (±)-dihydrochrysanthemolactone, 95.9 g. of ethanol, 3.5 g. of concentrated sulfuric acid and 300 ml. of toluene was heated to be boiled. The liquid distilled out was passed through a cooler, thereafter was further passed through a tube packed with Molecular Sieves to remove water produced, and was recycled to the reactor. The heating was continued for 3 hours. After the reaction was over, ethanol was removed by distillation under a reduced pressure. To the residue was added 300 ml. of toluene, and the mixture was washed with water three times until the aqueous layer was made neutral, and was dried over anhydrous sodium sulfate. Toluene was removed by distillation under a reduced pressure, and the residual oily product was subjected to distillation under reduced pressure of 10 mm. Hg, whereby 75.0 g. of almost colorless ethyl (±)-cis-chrysanthemate was obtained, b.p. 96° C., purity 96%.

EXAMPLE 5

A mixture of 70 g. of (±)-dihydrochrysanthemolactone, 95.9 g. of ethanol, 3.5 g. of p-toluenesulfonic acid and 300 ml. of toluene was heated to be boiled, and the liquid distilled out was passed through a tube packed with a Molecular Sieve. After the reflux was continued for 3 hours, the mixture was treated according to the procedure similar to that of Example 4, whereby 74.7 g.

of almost colorless liquid was obtained. According to gas chromatography analysis, it was confirmed that the liquid contained 95.8% of ethyl (±)-cis-chrysanthemate.

EXAMPLE 6

A mixture of 70 g. of (±)-dihydrochrysanthemolactone, 95.9 g. of ethanol, 0.7 g. of concentrated sulfuric acid and 300 ml. of toluene was heated to be boiled, and the reflux was continued for 12 hours according to the procedure similar to that of Example 4. After the reaction was over, the mixture was treated similarly as in Example 4, whereby 75.1 g. of almost colorless liquid was obtained. According to gas chromatography analysis, it was confirmed that the liquid contained 95.7% of ethyl (±)-cis-chrysanthemate.

What is claimed is:

1. A process for preparing a lower alkyl cis-chrysanthemate of the formula,

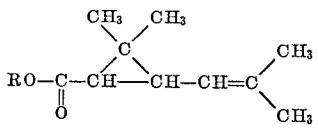

wherein R is a lower alkyl, which comprises reacting dihydrochrysanthemolacetone of the formula,

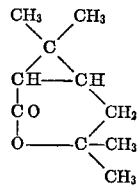

with a lower aliphatic alcohol in the presence of an acid catalyst selected from the group consisting of concentrated sulfuric acid and p-toluenesulfonic acid in an organic solvent under reflux, while water produced is removed from the reaction system.

2. A process according to Claim 1, wherein the organic solvent is a member of benzene, toluene, xylene, carbon tetrachloride, chloroform and 1,2-dichloroethane.

3. A process according to Claim 1, wherein water produced is removed as an azeotropic mixture with the organic solvent.

4. A process according to Claim 1, wherein water produced is removed by passing the reflux through a dehydrating agent.

5. A process according to Claim 4, wherein the dehydrating agent is a member of Molecular Sieves and an activated alumina.

6. A process according to Claim 1, wherein the lower aliphatic alcohol is a member of methanol, ethanol, 1-propanol, 2-propanol, 1-butanol and 2-butanol.

7. A process according to Claim 1, wherein the dihydrochrysanthemolactone is an optically active or inactive isomer.

References Cited

Wagner et al.: Synthetic Organic Chemistry, p. 496 (1953).

Crombie et al.: J. Sci. Food & Agric., 2, 421 (1951).

Weissberger: Heterocyclic Compounds, pp. 816–7 (1964).

Wiberg: Organic Chemistry, pp. 214–217 (1960).

ROBERT GERSTL, Primary Examiner

U.S. Cl. X.R.

260—514 H